April 14, 1959
R. H. DICKE
2,882,493
GAS CELLS FOR MICROWAVE SPECTROSCOPY
AND FREQUENCY-STABILIZATION
Filed Oct. 27, 1953
2 Sheets-Sheet 1
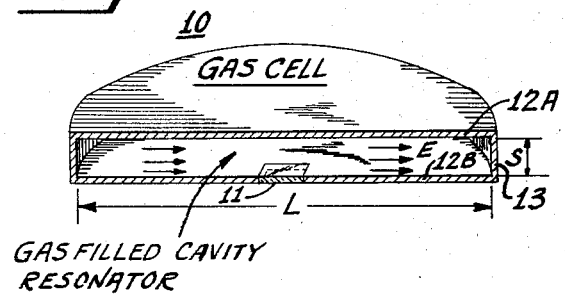
Fig_1
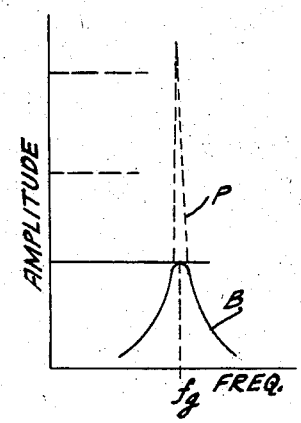
Fig_3
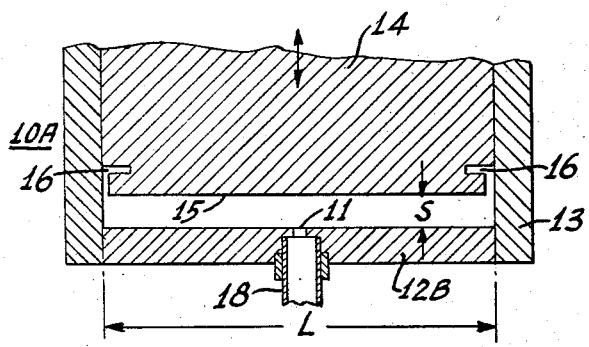
Fig_4
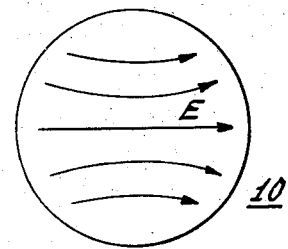
Fig_2
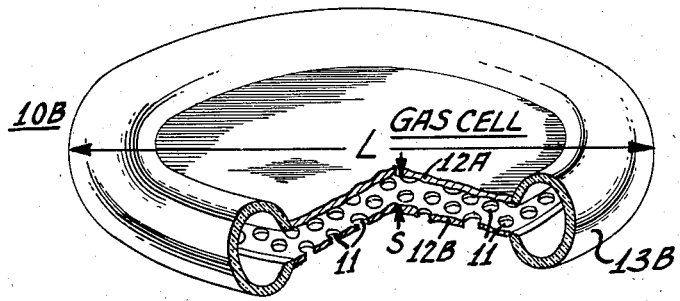
Fig_5
INVENTOR.
ROBERT H. DICKE
BY
ATTORNEY April 14, 1959  R. H. DICKE  2,882,493
GAS CELLS FOR MICROWAVE SPECTROSCOPY
AND FREQUENCY-STABILIZATION
Filed Oct. 27, 1953  2 Sheets-Sheet 2
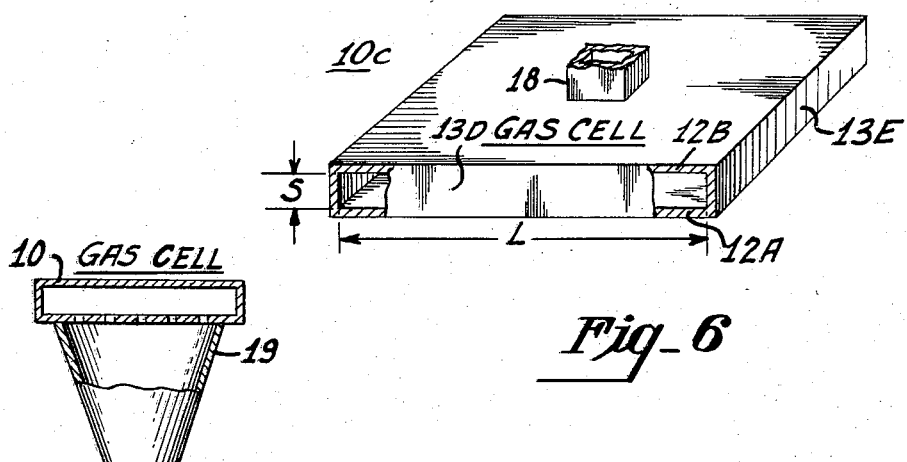
Fig_6
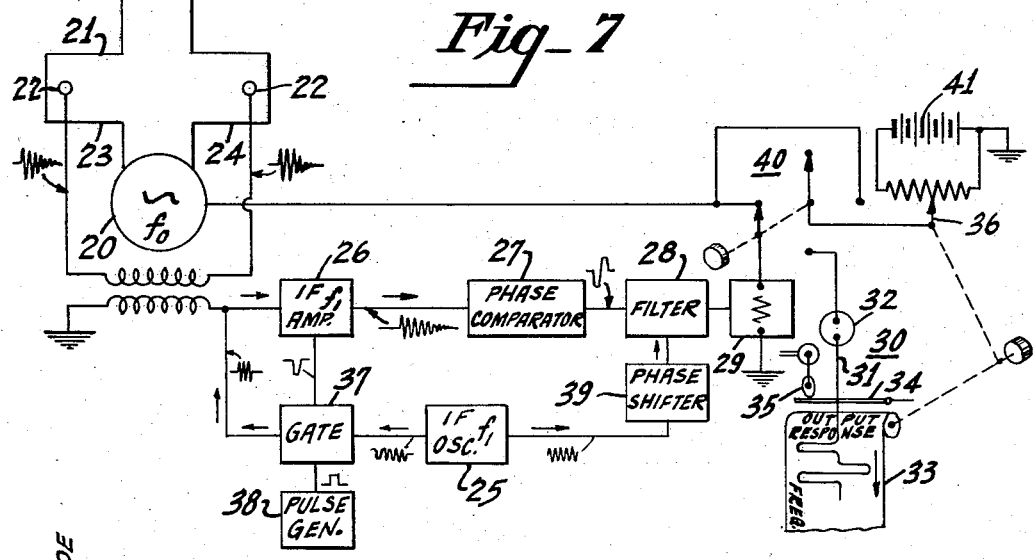
Fig_7
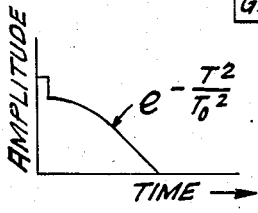
Fig_8A
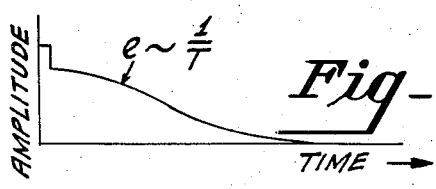
Fig_8B
INVENTOR.
ROBERT H. DICKE
BY [signature]
ATTORNEY United States Patent Office 2,882,493
Patented Apr. 14, 1959

2,882,493

GAS CELLS FOR MICROWAVE SPECTROSCOPY AND FREQUENCY-STABILIZATION

Robert H. Dicke, Princeton, N.J.

Application October 27, 1953, Serial No. 388,523

17 Claims. (Cl. 324—58.5)

This invention relates to methods, systems and devices utilizing molecular resonance of gases in such arts as microwave spectroscopy and frequency-stabilization of microwave generators.

In accordance with method aspects of the present invention, the gas to be analyzed or to be used as a frequency standard or for other purposes, is confined at suitably low pressure and is periodically subjected to microwave energy which shock-excites the gas molecules into states for which the molecules possess oscillating dipole moments. For a particular class of molecules, there is provided a long path in which they radiate coherently in the intervals between successive exciting pulses. From such coherent radiation, there is derived an echo pulse or signal having a sharp amplitude/frequency characteristic affording enhanced resolution in microwave spectroscopy and enhanced stiffness of control in frequency-stabilizing systems.

In preferred forms of apparatus, the microwave energy is applied to a gas cell or cavity resonator defined by extensive conductive surfaces equispaced at a distance substantially equal to one half-wavelength at a frequency corresponding with a molecular resonance frequency of the gas. The extent or major dimension of the surfaces in direction normal to the applied microwave energy is large relative to a wavelength at such molecular resonance frequency and is comparable to the mean free path of the gas molecules at the low pressure existent in the cell. With a gas cell of such construction, there is obtained coherent radiation from the gas at a sharply defined frequency and such coherent radiation persists for a relatively long time after excitation of the gas.

In a preferred system using such gas cell for microwave spectroscopy, frequency-stabilization or the like, the exciting pulses are provided by gating an intermediate-frequency oscillator and combining the intermediate-frequency pulses with the output of a microwave generator. In the interval between pulses, the echo-pulse signal from the cavity is combined with the output of the microwave generator and the resulting beat frequency output is impressed upon an intermediate-frequency amplifier. The resulting intermediate-frequency signal and the output of the intermediate-frequency oscillator are impressed upon a phase-comparator, or equivalent, to provide a direct-current signal which may be used as a control signal for stabilizing the microwave oscillator or to actuate a recorder in a microwave spectrometer.

The invention further resides in methods, systems and devices having the features of novelty and utility hereinafter described and claimed.

For a more detailed understanding of the invention and for illustration of preferred systems and apparatus, reference is made to the accompanying drawings in which:

Fig. 1 is a sectional view, in perspective, of a gas cell;

Fig. 2 is a plan view of the preferred field pattern for the cell of Fig. 1;

Fig. 3 is an explanatory view referred to in discussion of Fig. 1 and other figures;

Fig. 4 is a sectional view of a tunable gas cell;

Figs. 5 and 6 are perspective views of modified forms of gas cells;

Fig. 7 is a block diagram of a microwave system suited for any of the cells of Figs. 1, 5, 6 and 7; and Figs. 8A–8B are explanatory figures referred to in discussion of Fig. 6.

Referring to Fig. 1, the gas cell 10 comprises metal walls 12A, 12B, and 13 defining a cylindrical cavity resonator or chamber suited to confine, at low pressure, a gas such as ammonia, ethylchloride, ethyl oxide, carbonyl sulphide or the like, having an absorption resonance in the proper frequency region. A pulse of microwave energy fed into the cavity excites the gas molecules into states for which they possess oscillating dipole moments. The microwave energy may be supplied to the cavity in any suitable manner, as through a waveguide window 11 of material, such as mica, which is transparent to the microwave energy and which may be hermetically sealed to the cavity wall.

The spacing S between the end walls 12A and 12B of the cavity is approximately one half-wavelength $$\frac{\lambda}{2}$$

or more generally any small odd integral number ($n$) of half-wavelengths at a molecular resonant frequency of the gas. The impressed microwave pulse produces a transverse wave which oscillates between the cavity end walls 12A, 12B during application of the pulse and for some time thereafter. The excitation of the cavity produces a transverse electric field E extending generally as shown in Figs. 1 and 2. As above stated, the exciting pulse produces oscillation of the molecules and such oscillation continues after termination of an exciting pulse until the molecules in turn strike a wall of the cavity.

Considered as a whole and speaking generally, the gas molecules are moving in all directions and at various velocities so that in absence of the present invention, the spectrum line or band radiated by the gas after a pulse is generally of the blunted shape represented by the full line curve B (Fig. 3). This curve B is exemplary of the echo pulse from a cavity resonator not embodying the present invention as to wall spacing S, above defined, as to length L below discussed, and as to electric field distribution in the cavity.

The blunted shape of the spectral line results from one or a combination of the motion of molecules from a region with a field of one algebraic sign radio frequency field to a region with fields of the opposite algebraic sign, collisions of the molecules with the walls of the cavity, and in case of gas at higher pressures to collisions of gas molecules with each other.

The present invention resides in part in a combination of a gas cell of suitable shape excited by an electromagnetic field of suitable field distribution and containing a suitable gas at the proper pressure. The gas pressure must be sufficiently low that the aforementioned molecule-molecule cause of the blunted shape of the spectral line is not a significant factor.

In the preferred form of the invention, the gas cell-cavity is substantially $$\frac{\lambda}{2}$$

in thickness and is excited in the lowest mode for which the electric field is purely transverse to the large flat sides. With this field distribution there are no electric field nodal surfaces internal to the cavity resonator and a molecule sees always the same phase of the electric field in the resonator. Consequently, Doppler effect, or broadening of a spectral line which results from the motion of a molecule from a region in the cavity where the oscillating electric field has one algebraic sign to a part for which the field has the opposite sign is not a significant factor.

The final cause of the breadth of spectral lines, namely, the collision of the molecules with the walls of the gas cell is still present, however, with the gas cell of the above-described shapes. There exists a class of molecules which moves substantially parallel to the large flat side of the cavity and consequently for which there is a long uninterrupted radiation time. This is a small class of molecules but has an importance far greater than its size indicates. First, because of the long radiation period the energy radiated by each such molecule is far greater than that radiated by the average molecule. Second, this energy is radiated, because of the long uninterrupted radiation time into a very narrow spectral region about the natural molecular resonance frequency. Consequently, the contribution of these molecules to the total radiation in this narrow spectral region is unusually significant and is in fact the major part.

To recapitulate, the class of molecules which are moving parallel, or nearly parallel, to the ends 12A, 12B of cavity 10 will move a relatively long distance before they hit a wall of the cavity and hence the molecules of this class will radiate coherently for a relatively long time and at a frequency which is characteristic of the particular gas. To insure this protracted coherent radiation of a sharply defined frequency, the distance L (in this figure the diameter of the circular plates 12A, 12B) is large compared to $\lambda$ (preferably at least $10\lambda$) and is comparable with the mean free path of the molecules at the existent low gas pressure which is of the order of $10^{-3}$ millimeters of mercury or less. The molecules of this particular class, though numerically small considering the entire population of gas molecules, are of significance as a source signal because they radiate coherently for a long time at a sharply defined frequency. Consequently, the echo pulse of the cavity resonator 10 has a high sharp peak P (Fig. 3) superimposed upon a rather broad base B.

The exciting pulse is very brief, of the order of a microsecond, for example, so that as may be shown by Fourier analysis, the impressed exciting pulse includes a wide band of discrete frequencies embracing a molecular resonant frequency of the gas. During excitation of the gas molecules, the microwave energy within the cavity is consequently of many frequencies: after termination of the exciting pulse, the gas molecules, shock-excited into oscillation at a molecular resonance frequency, continue to radiate at such frequency until they in turn collide with the wall of the cavity. By dimensioning the cavity as above described, there is provided a path in which the most significant class of molecules can radiate coherently for a long time sharply to peak the frequency/amplitude characteristic of the echo pulse and so provide a signal source having marked advantages in microwave spectroscopy and in frequency-stabilization of microwave oscillators. In general, the greater the distance L the greater the relative peak amplitude as the molecules radiate without interruption for a greater period of time. However, even with a relatively small cavity resonator ($L=5\lambda$), a relative peak gain of 300 percent, or better, has been obtained for the 3,3 line of ammonia.

The gas cell 10A of Fig. 4 is similar to the cell of Fig. 1 in that the spacing S between the extensive surfaces of the equidistant walls is approximately $$\frac{n\lambda}{2}$$

with $n$ an odd integer and the length L of the path for the significant class of molecules is very large compared to $\lambda$. In Fig. 4, the gas cell cavity resonator is tunable by the metal plunger 14 whose lower face 15 corresponds with the upper plate or wall 12A of Fig. 1. The peripheral groove 16 of the tuning plunger serves as a microwave choke to maintain the proper current/field relations in the cavity despite imperfections of the sliding contact between plunger 14 and the rim or side wall 13 of the cavity.

In the particular arrangement shown in Fig. 4, a waveguide 18 supplies the exciting microwave pulses to the resonator and receives therefrom the resulting echo pulses. The microwave generator which supplies the microwave energy to the waveguide, or equivalent transmission line, may be of any suitable type such as a magnetron, klystron, traveling wave tube, or the like, and an associated pulser. The waveguide 18 terminates in alignment with the window 11 which prevents escape of gas from the cell, yet permits passage of microwave energy. A hermetic seal between the tuning plunger 14 and the side wall 13 of the cell may be provided by any of the greases commonly used in vacuum pump systems.

In the forms of gas cells shown in Figs. 1 and 4, the side and end walls of the gas cell are all of conductive material and consequently there is no radiation from the cell during the exciting pulses or the echo pulses. In the gas cell shown in Fig. 5, the end walls 12A, 12B are conductive, as before, with dimensions S and L satisfying the relations above defined. However, the side wall or rim 13B is of insulating material and consequently with this modification there is a small amount of radiation from the gas cell through the rim. This radiation through the sides serves to damp all but the wanted mode of oscillation of the cavity. With a cavity of large dimension the damping of unwanted modes is a desirable feature. The rim 13B is bonded to the periphery of plates 12A, 12B to provide a hermetic seal and is shaped to provide an impedance match to the ambient atmosphere.

With gas cell 10B, as in the cells previously described, the pulse-excited molecules of the gas continue to radiate until they collide with the side or end walls and the selected class of molecules will radiate for a relatively long time because of the extended path provided by the dimension L. As distinguished from the cells previously described, during the period of the echo pulse, there is radiation from the gas cell 10B of sharply defined frequency and in a particular direction. Thus, this type of cell, in addition to the uses above mentioned, may also be used as a directional signal source or antenna in microwave beacon systems or the like, and as such has the unique property that the frequency of the directional signal radiated during the echo pulse is not affected by instability of the generator supplying the exciting pulses.

As in Figs. 1 and 4, the transfer of microwave energy to and from the associated waveguide or transmission system may be through a single window. Preferably, however, when the cavity is very large, there are provided a plurality of windows 11 (Fig. 5) and the microwave energy may be supplied, as shown in Fig. 7, by a microwave horn 19, whose flared end overlies the pattern of windows of the gas cell. The number and spacing of the windows is selected to produce a transverse wave of more uniform intensity throughout the extended dimension L of the gas cell. This same horn and multi-window arrangement may be used with any of the other gas cells herein disclosed.

It is not essential that the gas cell be of circular cross section as in Figs. 1, 4, and 5 to obtain the advantages above mentioned. For example, in the modification 10C shown in Fig. 6, the conductive walls 12A, 12B are of rectangular outline. As in the previously described modifications, the spacing between these walls is $$\frac{n\lambda}{2}$$

and the major dimension L of the rectangle is large compared to $\lambda$. As is Figs. 1 and 2, all of the side walls of cell 10C may be conductive to preclude radiation from the gas cell. If the cell 10C, like cell 10B of Fig. 5, is to be used as a directional source of radiation, at least the side walls 13D, 13E, i.e., the side walls normal to the dimension L, should be of insulating material.

With the modifications of Figs. 1, 4 and 5 the orientation of the waveguide opening is of no consequence because of the symmetry of the cavity resonator. However, with the cell 10C, the waveguide opening, or equivalent feeding means, must be oriented in a particular direction to establish the required fields within the cavity. Keeping in mind that the exciting pulse should produce transverse waves oscillating between the walls 12A, 12B, and that an electric field should be established parallel to these walls, the proper orientation of the window, probe or loop is a known matter of microwave technique.

With any of the foregoing cells in which radiation from the gas is confined within the gas cell, the echo pulse may be detected by any suitable detecting arrangement associated with the waveguide or other transmission signal which supplies the exciting pulses to the gas cell and the associated receiver may be rendered inoperative during the exciting pulse by any suitable gating or blanking arrangement. A preferred arrangement, however, is shown in Fig. 7, now described.

The microwave generator 20 continuously supplies microwave energy to the "magic tee" 21 shown by conventional symbol. Crystal mixers 22, 22, or equivalent, are disposed respectively in arms 23, 24 of the magic tee which differ in length by $$m\frac{\lambda}{4}$$

(where $m$ is a small odd integer) to obtain a quadrature phase relation. There is periodically impressed upon the mixers the output of the intermediate-frequency oscillator 25, so to provide the microwave pulses which excite molecular resonance of the gas within the cell 10, generically illustrative of all the cells herein described. Upon termination of the pulse, the radiation from the gas molecules produces an echo pulse having the frequency $f_g$ characteristic of the gas. The echo pulse signal of frequency ($f_g$) beats with the continuously applied microwave signal of frequency ($f_0$) which is demodulated by the mixers 22, 22 to provide the output signal of frequency $f_1$.

After amplification by amplifier 26, the output signals of the demodulators 22 are impressed upon one input circuit of a suitable phase-comparator 27. Phase-reference signals of frequency $f_1$ are supplied to another input circuit of the phase-comparator 27 by the intermediate frequency oscillator 25, the interposed phase-shifter 39 providing for null output of the phase-comparator for a beat-frequency equal to frequency $f_1$. When the algebraic sum of the oscillator frequencies $f_0$ and $f_1$ is somewhat different from frequency $f_g$ (a molecular-resonance frequency of the gas), the output of the phase-comparator 27 is a direct-current signal of polarity and magnitude corresponding with such frequency difference and may be used to stabilize the frequency of microwave generator 20, or in microwave spectroscopy to actuate a recorder. Preferably, a filter 28 is interposed between the comparator proper and its output element 29 to minimize modulation components, and to narrow the band pass for purposes of noise rejection.

In the particular system shown in Fig. 7, pulsing of the output of the intermediate-frequency oscillator 25 and periodic blanking of the intermediate-frequency amplifier are provided by the gate 37 which is periodically opened by the pulse generator 38. These electronic components may per se be of conventional type and need not be further described. For optimum results, the pulsing rate and the pulse duration should be suitably correlated to the bandwidth of the intermediate-frequency amplifier 26: for example, for a 30-megacycle amplifier having a bandwidth of about 5 megacycles, the pulse repetition rate may be about 20,000 per second and the pulse duration about 1 microsecond.

An advantage of using a preferred type of gas cell in the system of Fig. 7 is shown by comparison of Figs. 8A and 8B. With the ordinary gas cell, the shape of the output amplitude function from the intermediate-frequency amplifier 26 is generally as shown in Fig. 8A of which it is characteristic that after the initial shock-excitation, the signal amplitude, because of Doppler effect, rapidly decays in accordance with $$e^{-\frac{T^2}{T_0^2}}$$

where, for example, $T_0$ is 8.6 microseconds for ammonia gas at room temperature and $T$ is the time after pulsing. In such case, the observed or effective Q of the gas line is low as may also be deduced from the blunted frequency-amplitude curve B of Fig. 4. With a cell providing a long path for the selected class of excited gas molecules, the shape of the output pulse of amplifier 26 is generally of the shape shown in Fig. 8B of which it is characteristic that the amplitude after some initially complicated behavior slowly decays in accordance with $$\frac{1}{T}$$

In such latter case, the observed or effective Q of the gas line is substantially enhanced as may also be deduced from the sharply peaked curve P of Fig. 3.

For frequency-stabilization, the direct-current signal output of comparator 27 may be used in manner per se known to vary the bias of a frequency-control electrode of the microwave oscillator tube or of an associated reactance tube of the microwave oscillator system 20. In the composite system shown in Fig. 7, frequency-stabilization of the microwave oscillator 20 is effected when switch 40 is in the position indicated to inject the direct-current output of the comparator 27 in the frequency-control circuit of the microwave generator system 20. For use of the system of Fig. 7 in microwave spectroscopy, switch 40 is thrown to its other position to apply the D.C. output of phase-comparator 27 to a direct-current recorder 30 of any suitable type. For simplicity of illustration, the recorder is shown as of the type in which the pointer 31 of a galvanometer 32 is periodically engaged and pressed against a recorder chart 33 by a depressor bar 34 oscillated by a motor-driven cam 35; preferably, however, the recorder is of the electronic high-speed self-rebalancing type. The drive for recorder chart 30 is coupled for adjustment in unison with a control 36 whose setting determines the frequency of the microwave generator 20. Control 36 and the chart drive may be moved manually or automatically by a timing motor so to provide in either event a record trace showing one or more absorption lines of the gas over a selected portion of the microwave spectrum. For simplicity of illustration, control 36 is shown as a potential divider for a direct-current source 41 which provides the frequency-control bias of the microwave generator.

It shall be understood that the cells and systems specifically described are for purposes of explanation and that modifications thereof are within the scope of the appended claims.

What is claimed is:

1. A cell containing gas at low pressure and exhibiting molecular resonance when excited by microwave energy comprising a cavity defined by conductive surfaces with spacing substantially equal to $$n\frac{\lambda}{2}$$

(where $\lambda$ is a wavelength corresponding with a molecular resonance frequency of the gas and $n$ is a small odd integer) and whose extent is large compared to $\lambda$ and is comparable with the mean free path of the gas molecules.

2. A gas cell as in claim 1 in which said surfaces are circular with their peripheries joined by a conductive surface.

3. A gas cell as in claim 1 in which said surfaces are circular with their peripheries joined by a non-conductive surface.

4. A gas cell as in claim 1 in which said surfaces are superposed rectangular surfaces.

5. A gas cell as in claim 1 in which at least one of said surfaces is movable to vary said spacing to obtain said relation of $$n\frac{\lambda}{2}$$

for different molecular resonance frequencies.

6. A cell as in claim 1 provided with means for producing therein a transverse wave oscillating between said parallel surfaces.

7. A cell as in claim 1 in which one of said surfaces has a plurality of spaced windows transparent to microwave energy.

8. A cell as in claim 7 provided with a microwave horn whose mouth overlies said spaced windows and in cooperation therewith provides substantial uniformity of the microwave electric field in the gas cell.

9. A microwave system comprising, a cell containing gas at low pressure and exhibiting molecular resonance when excited by microwave energy, said cell having a cavity defined by conductive surfaces with spacing substantially equal to $$n\frac{\lambda}{2}$$

(where $\lambda$ is a wavelength corresponding with a molecular resonance frequency of the gas and $n$ is a small odd integer) and whose extent is large compared to $\lambda$ and is comparable with the mean free path of the gas molecules, means coupled to said gas cell for intermittently supplying pulses of microwave energy to said cell to excite molecules of the gas, and means coupled to said cell for receiving radiation from the excited molecules in the intervals between said pulses.

10. A microwave system as in claim 9 including a recorder coupled to said receiving means for plotting the intensity of the radiation as a function of the exciting microwave frequency.

11. A microwave system as in claim 9 in which the output of said receiving means is a voltage and means is provided for applying said voltage to stabilize the frequency of the exciting microwave energy.

12. A microwave system comprising, a cell containing gas at low pressure and exhibiting molecular resonance when excited by microwave energy, said cell having a cavity defined by conductive surfaces with spacing substantially equal to $$n\frac{\lambda}{2}$$

(where $\lambda$ is a wavelength corresponding with a molecular resonance frequency of the gas and $n$ is a small odd integer) and whose extent is large compared to $\lambda$ and is comparable with the mean free path of the gas molecules, a microwave oscillator, a pulsed low frequency oscillator, a mixer coupled to said microwave oscillator, to said low frequency oscillator, and to said gas cell for applying to said gas cell pulses of electrical energy whose frequency substantially corresponds with a molecular resonance frequency of the gas to excite said gas to provide in the interval between each of said pulses a gas radiation signal at said resonance frequency, an intermediate-frequency amplifier, means for coupling from said mixer an intermediate-frequency signal resulting from the mixing of said radiation signal and the output of said microwave oscillator, means for applying said intermediate-frequency signal to said intermediate-frequency amplifier, and means in the output circuit of said amplifier for producing a direct-current voltage varying in accordance with the relation of said radiation signal to a reference signal.

13. A microwave system as in claim 12 in which said direct-current voltage is applied to a recorder to plot the intensity of radiation from the gas as a function of the frequency of the mixer output pulses.

14. A microwave system as in claim 12 in which said direct-current voltage is applied to stabilize the frequency of the microwave oscillator.

15. A system for obtaining a microwave signal having a sharp amplitude frequency characteristic which comprises, means for confining a body of gas at low pressure, means for periodically applying to the confined gas pulses of microwave energy to shock-excite the gas molecules into states for which they possess oscillating dipole moments, means for providing for the flow of a class of said shock-excited molecules moving transversely of the applied microwave energy over a long path in which the molecules of such class radiate coherently in the interval between successive pulses, and means for utilizing the coherent radiation of said class as a signal source.

16. A system for obtaining enhanced resolution which comprises, means for confining at low pressure a body of the gas to be analyzed, means for periodically applying to the confined gas pulses of microwave energy of different known frequencies to shock-excite the gas molecules into states for which they possess oscillating dipole moments, means for providing for the flow of a class of said shock-excited gas molecules moving transversely of the applied microwave energy over a long path in which they radiate coherently in the interval between successive pulses, and means for utilizing such coherent radiation of said class at different applied frequencies in determination of a molecular resonance frequency of the gas.

17. A system for stabilizing the frequency of a microwave generator comprising, means for applying to a confined body of gas at low pressure pulses of microwave energy whose frequency is directly related to the generator frequency, said pulses shock-exciting the gas molecules into states for which they possess oscillating dipole moments, means for providing for the flow of a class of gas molecules moving transversely of the applied microwave energy over a long path in which they radiate coherently in the interval between successive pulses, means for deriving from the coherent radiation of said class of gas molecules a direct-current voltage varying in sense and magnitude in accordance with deviations from a desired generator frequency, and means for utilizing said voltage to minimize said deviations.

References Cited in the file of this patent

UNITED STATES PATENTS

| Number | Name | Date |
|---|---|---|
| 2,044,413 | Weyrich | June 16, 1936 |
| 2,241,119 | Dallenbach | May 6, 1941 |
| 2,265,796 | Boersch | Dec. 9, 1941 |
| 2,457,673 | Hershberger | Dec. 28, 1948 |
| 2,535,331 | Swarts | Dec. 26, 1950 |
| 2,589,494 | Hershberger | Mar. 18, 1952 |
| 2,605,459 | Cook | July 29, 1952 |
| 2,616,966 | Haeff et al. | Nov. 4, 1952 |
| 2,630,472 | McArthur | Mar. 3, 1953 |
| 2,630,488 | Clogston | Mar. 3, 1953 |
| 2,636,926 | Wilson et al. | Apr. 28, 1953 |
| 2,637,767 | Hershberger | May 5, 1953 |
| 2,712,069 | Goldstein | June 28, 1955 |
| 2,837,693 | Norton | June 3, 1958 |

OTHER REFERENCES

Lange: "Meas. of High Q Cavities at 10,000 MC," Bell Tel. Lab. AIEE Report, December 1946.